United States Patent
Sun

(10) Patent No.: US 12,555,794 B2
(45) Date of Patent: Feb. 17, 2026

(54) ELECTROCHEMICAL APPARATUS AND ELECTRONIC APPARATUS

(71) Applicant: Dongguan Amperex Technology Limited, Guangdong (CN)

(72) Inventor: Zhenhe Sun, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 555 days.

(21) Appl. No.: 18/147,914

(22) Filed: Dec. 29, 2022

(65) Prior Publication Data
US 2023/0207819 A1   Jun. 29, 2023

(30) Foreign Application Priority Data
Dec. 29, 2021   (CN) .......................... 202111642228.7

(51) Int. Cl.
| | |
|---|---|
| *H01M 10/0525* | (2010.01) |
| *H01M 4/62* | (2006.01) |
| *H01M 10/0567* | (2010.01) |
| *H01M 4/02* | (2006.01) |

(52) U.S. Cl.
CPC ....... *H01M 4/623* (2013.01); *H01M 10/0525* (2013.01); *H01M 10/0567* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2004/0029008 A1 | 2/2004 | Winterberg et al. | |
| 2006/0024584 A1* | 2/2006 | Kim ................. | H01M 10/4235 429/231.95 |
| 2010/0239910 A1* | 9/2010 | Tode ................. | H01M 4/622 429/223 |
| 2011/0143198 A1* | 6/2011 | Choi ................. | H01M 10/052 252/182.1 |

FOREIGN PATENT DOCUMENTS

| | | |
|---|---|---|
| CN | 101548425 A | 9/2009 |
| CN | 104396060 A | 3/2015 |
| CN | 110444758 A | 11/2019 |
| CN | 111082127 A | 4/2020 |
| CN | 111416152 A | 7/2020 |
| EP | 3518334 A1 | 7/2019 |
| KR | 100385700 B1 | 5/2003 |
| WO | 0182403 A1 | 11/2001 |
| WO | 2006083099 A1 | 8/2006 |

OTHER PUBLICATIONS

Office Action issued on Jan. 18, 2024, in corresponding Chinese Application No. 202111642228.7, 13 pages.
Office Action issued on Jul. 3, 2025, in corresponding European Application No. 22 216 835.3, 5 pages.
Extended Search Report issued on Jun. 27, 2023, in corresponding European Application No. 22216835.3, 7 pages.

* cited by examiner

*Primary Examiner* — Carlos Barcena
(74) *Attorney, Agent, or Firm* — Maier & Maier, PLLC

(57) ABSTRACT

An electrochemical apparatus includes a positive electrode plate. The positive electrode plate includes a positive electrode material layer. The positive electrode material layer includes a fluorine-containing polymer and a cyano-containing polymer. A ratio b/a of a mole number b of nitrogen to a mole number a of fluorine in the positive electrode material layer satisfies $0.1 \leq b/a \leq 0.5$. Adding the fluorine-containing polymer and the cyano-containing polymer in the positive electrode material layer and controlling the ratio b/a satisfies the above relationship enable a good bonding effect between particles in the positive electrode material layer. In addition, after cyano functional groups interact with transition metal ions of the positive electrode active material at full charge, oxidizing ability of transition metal ions is weakened, reducing side reactions between the positive electrode material layer and electrolyte, thereby improving high-temperature performance of the electrochemical apparatus.

18 Claims, 3 Drawing Sheets

ELECTROCHEMICAL APPARATUS AND ELECTRONIC APPARATUS

CROSS-REFERENCE TO RELATED APPLICATIONS

This application claims priority to Chinese Patent Application No. 202111642228.7, filed on Dec. 29, 2021, the whole disclosure of which is incorporated herein by reference.

FIELD

This application relates to the field of electrochemical technologies, and in particular to an electrochemical apparatus and an electronic apparatus.

BACKGROUND

Lithium-ion batteries are widely used in wearable devices, smart phones, drones, notebook computers, and other fields because of their merits such as high working voltage, high energy density, environmental friendliness, stable cycling, and safety. With the development of modern information technology and the expansion of the application of lithium-ion batteries, the high-temperature performance of lithium-ion batteries has become a bottleneck problem for some projects, seriously restraining the development of lithium-ion batteries.

SUMMARY

This application is intended to provide an electrochemical apparatus and an electronic apparatus so as to improve high-temperature performance of electrochemical apparatuses. Specific technical solutions are as follows:

A first aspect of this application provides an electrochemical apparatus including a positive electrode plate, where the positive electrode plate includes a positive electrode material layer, and the positive electrode material layer includes a fluorine-containing polymer and a cyano-containing polymer, where a ratio b/a of a mole number b of nitrogen to a mole number a of fluorine in the positive electrode material layer satisfies $0.1 \leq b/a \leq 0.5$. Regardless of any theory, adding the fluorine-containing polymer and the cyano-containing polymer into the positive electrode material layer and controlling the ratio b/a of the mole number b of nitrogen to the mole number a of fluorine in the positive electrode material layer so that b/a satisfies the above relationship enable a good bonding effect between particles in the positive electrode material layer. In addition, after cyano functional groups having strong electronegativity interact with transition metal ions of the positive electrode active material in the positive electrode material layer at full charge, oxidizing ability of the transition metal ions is weakened, reducing side reactions between the positive electrode material layer and electrolyte, thereby improving high-temperature performance of the electrochemical apparatus.

In one implementation of this application, the fluorine-containing polymer includes at least one of polyvinylidene fluoride, polytetrafluoroethylene, polyhexafluoropropylene, vinylidene fluoride-tetrafluoroethylene copolymer, vinylidene fluoride-hexafluoropropylene copolymer, tetrafluoroethylene-hexafluoropropylene copolymer, or vinylidene fluoride-tetrafluoroethylene-hexafluoropropylene terpolymer.

In one implementation of this application, the cyano-containing polymer includes at least one of polyacrylonitrile, poly(2-butenenitrile), poly(3-butenenitrile), acrylonitrile-(2-butenenitrile) copolymer, acrylonitrile-(3-butenenitrile) copolymer, (2-butenenitrile)-(3-butenenitrile) copolymer, acrylonitrile-(2-butenenitrile)-(3-butenenitrile) terpolymer, or melamine.

In one implementation of this application, a molar ratio of carbon (C) to nitrogen (N) in the cyano-containing polymer is m, and $2<m \leq 6$. Regardless of any theory, controlling the value of m so that m is in the above range can improve high-temperature performance of the electrochemical apparatus.

In one implementation of this application, a weight average molecular weight of the cyano-containing polymer is 250 to 8000. Regardless of any theory, controlling the weight average molecular weight Mw of the cyano-containing polymer so that Mw is in the above range can improve high-temperature performance of the electrochemical apparatus.

In one implementation of this application, the electrochemical apparatus further includes an electrolyte, where the electrolyte includes a nitrile additive, and based on a total mass of the positive electrode material layer, a percentage sum of the cyano-containing polymer and the nitrile additive is more than 0 wt % and less than or equal to 5 wt %. Regardless of any theory, controlling the percentage sum of the cyano-containing polymer and the nitrile additive so that the percentage sum is in the above range can avoid copper precipitation on a negative electrode caused due to excessive cyano functional groups in the electrolyte, thus improving the high-temperature performance of the electrochemical apparatus.

In one implementation of this application, the nitrile additive includes at least one of succinonitrile, adiponitrile, ethylene glycol bis(2-cyanoethyl) ether, or 1,2,3-tris(2-cyanoethoxy) propane.

In one implementation of this application, based on a total mass of the positive electrode material layer, a percentage sum of the cyano-containing polymer and the fluorine-containing polymer is 2 wt % to 5 wt %. Regardless of any theory, controlling the percentage sum of the cyano-containing polymer and the fluorine-containing polymer so that the percentage sum is in the above range can improve the high-temperature performance of the electrochemical apparatus.

In one implementation of this application, the positive electrode material layer includes a positive electrode active material, and the positive electrode active material includes at least one of lithium cobaltate, lithium manganate, lithium nickelate, lithium nickel manganate, lithium nickel cobalt oxide, lithium nickel cobalt manganate, lithium nickel cobalt aluminate, lithium iron phosphate, lithium iron manganese phosphate, or a lithium-rich material.

A second aspect of this application provides an electronic apparatus, including the electrochemical apparatus according to any one of the implementations in the first aspect of this application.

This application has the following beneficial effects:

This application provides an electrochemical apparatus and an electronic apparatus, where the electrochemical apparatus includes a positive electrode plate, the positive electrode plate includes a positive electrode material layer, and the positive electrode material layer includes a fluorine-containing polymer and a cyano-containing polymer, where a ratio b/a of a mole number b of nitrogen to a mole number a of fluorine in the positive electrode material layer satisfies $0.1 \leq b/a \leq 0.5$. Adding the fluorine-containing polymer and the cyano-containing polymer in the positive electrode material layer and controlling the ratio b/a of the mole number b of nitrogen to the mole number a of fluorine in the positive electrode material layer so that b/a satisfies the above relationship enable a good bonding effect between particles in the positive electrode material layer. In addition, after cyano functional groups having strong electronegativity interact with transition metal ions of the positive electrode active material in the positive electrode material layer at full charge, oxidizing ability of transition metal ions is weakened, reducing side reactions between the positive electrode material layer and electrolyte, thereby improving high-temperature performance of the electrochemical apparatus. Certainly, practicing any one of the products or methods of this application does not necessarily need to accomplish all the above advantages at the same time.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application.

DETAILED DESCRIPTION

Figure 1:
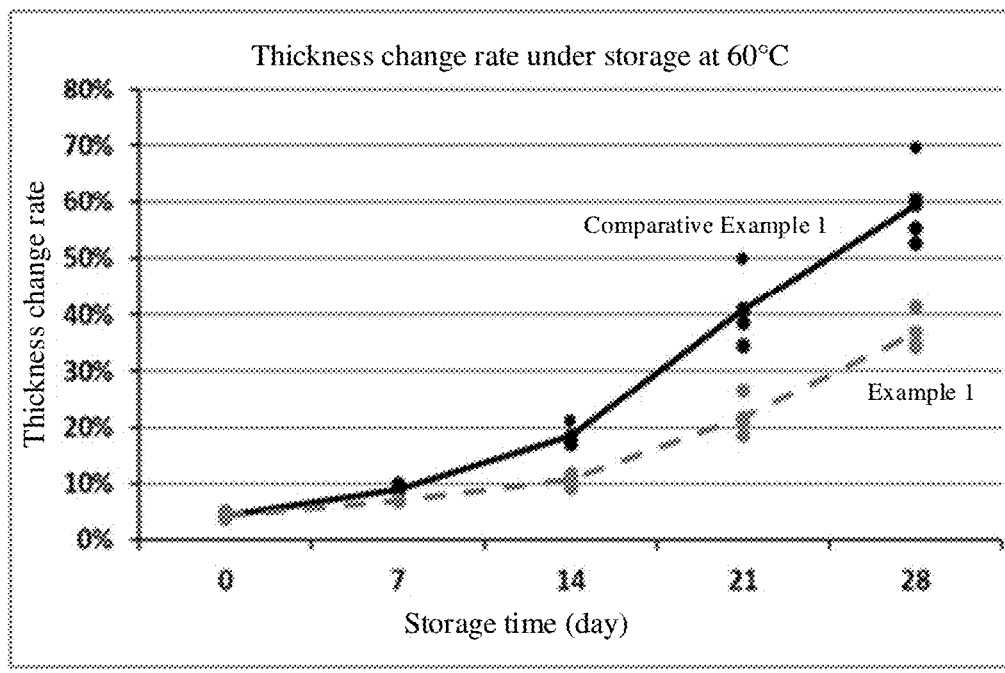
FIG. 1 shows thickness change rate change curves of Example 1 and Comparative Example 1 under storage at 60° C.

The following clearly and completely describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments in this application shall fall within the protection scope of this application.

It should be noted that, in the specific embodiments of this application, a lithium-ion battery is used as an example electrochemical apparatus for illustration of this application. However, the electrochemical apparatus in this application is not limited to lithium-ion batteries.

A first aspect of this application provides an electrochemical apparatus including a positive electrode plate, where the positive electrode plate includes a positive electrode material layer and the positive electrode material layer includes a fluorine-containing polymer and a cyano-containing polymer, where a ratio b/a of a mole number b of nitrogen to a mole number a of fluorine in the positive electrode material layer satisfies $0.1 \leq b/a \leq 0.5$.

The inventor of this application has found that adding the fluorine-containing polymer and the cyano-containing polymer in the positive electrode material layer and controlling the ratio b/a of the mole number b of nitrogen to the mole number a of fluorine in the positive electrode material layer so that b/a satisfies the above relationship enable a good bonding effect between particles in the positive electrode material layer, which improves high-temperature performance of the electrochemical apparatus. Regardless of any theory, this may be because, after cyano functional groups having strong electronegativity interact with transition metal ions of the positive electrode active material in the positive electrode material layer at full charge, oxidizing ability of transition metal ions is weakened, reducing side reactions between the positive electrode material layer and electrolyte, thereby improving high-temperature performance of the electrochemical apparatus. For example, the cyano functional groups complex with $Co^{4+}$ in the positive electrode active material lithium cobaltate in the positive electrode material layer at full charge so as to weaken the oxidizing ability of $Co^{4+}$, reducing side reactions between the positive electrode material layer and the electrolyte, thereby improving high-temperature cycling performance and high-temperature storage performance of the electrochemical apparatus.

For example, the ratio b/a of the mole number b of nitrogen to the mole number a of fluorine in the positive electrode material layer may be 0.15, 0.2, 0.25, 0.3, 0.35, 0.4, or 0.45 or in any range therebetween. When b/a is undesirably low, for example, b/a being 0.02, the mole number b of nitrogen is undesirably small, meaning an undesirably small amount of cyano functional groups. As a result, only a small number of transition metal ions in the positive electrode material layer can interact with cyano functional groups, making the positive electrode material layer prone to side reactions with the electrolyte, thereby impacting high-temperature performance of the electrochemical apparatus. When b/a is undesirably high, for example, b/a being 0.6, the mole number a of fluorine is undesirably small, meaning an undesirably small amount of fluorine-containing polymer, impacting the bonding effect between particles in the positive electrode material layer, and thus the positive electrode plate is at risk of film stripping or cold-press brittle fracture. Controlling the value of b/a so that b/a is in the above range can improve high-temperature performance of the electrochemical apparatus.

In one implementation of this application, the fluorine-containing polymer includes at least one of polyvinylidene fluoride, polytetrafluoroethylene, polyhexafluoropropylene, vinylidene fluoride-tetrafluoroethylene copolymer, vinylidene fluoride-hexafluoropropylene copolymer, tetrafluoroethylene-hexafluoropropylene copolymer, or vinylidene fluoride-tetrafluoroethylene-hexafluoropropylene terpolymer. Regardless of any theory, selecting the above binder is favorable for improvement of the high-temperature performance of the electrochemical apparatus.

In one implementation of this application, the cyano-containing polymer includes at least one of polyacrylonitrile, poly(2-butenenitrile), poly(3-butenenitrile), acrylonitrile-(2-butenenitrile) copolymer, acrylonitrile-(3-butenenitrile) copolymer, (2-butenenitrile)-(3-butenenitrile) copolymer, acrylonitrile-(2-butenenitrile)-(3-butenenitrile) terpolymer, or melamine. Regardless of any theory, selecting the above cyano-containing polymer can improve the high-temperature performance of the electrochemical apparatus.

In one implementation of this application, a molar ratio of carbon (C) to nitrogen (N) in the cyano-containing polymer is m, and $2 < m \leq 6$. For example, the molar ratio m of carbon (C) to nitrogen (N) in the cyano-containing polymer may be 2.5, 3, 3.5, 4, 4.5, 5, or 5.5 or in any range therebeween. Regardless of any theory, the value of m being in the above range can improve the high-temperature performance of the electrochemical apparatus. When the value of m is undesirably small, a small number of cyano polar functional groups are present, so that the electrochemical apparatus has no obvious improvement in the high-temperature performance. When the value of m is undesirably large, the cyano-containing polymer has poor solubility in a solvent such as N-methylpyrrolidone, making it hard to achieve uniform distribution on the positive electrode plate.

In one implementation of this application, a weight average molecular weight Mw of the cyano-containing polymer is 250 to 8000. Regardless of any theory, the weight average molecular weight Mw of the cyano-containing polymer being in the above range can improve the high-temperature performance of the electrochemical apparatus.

For example, the weight average molecular weight Mw of the cyano-containing polymer may be 300, 500, 1000, 2000, 3000, 4000, 5000, 6000, 7000, 7500 or in any range therebeween. When Mw is undesirably small, for example, being 250, the cyano-containing polymer easily dissolves in the electrolyte, causing an undesirably small amount of cyano-containing polymer in the positive electrode material layer so that inadequate protection is provided for the positive electrode active material, unfavorable for improvement of the high-temperature performance of the electrochemical apparatus. When Mw is undesirably large, for example, being 10000, the cyano-containing polymer does not have good solubility in an organic solvent such as N-methylpyrrolidone. As a result, the cyano-containing polymer and the positive electrode active material are not well mixed in the positive electrode material layer, so that many transition metal ions have no interaction with cyano functional groups and are apt to have side reactions with the electrolyte, thereby impacting high-temperature performance of the electrochemical apparatus. Controlling Mw so that Mw is in the above range not only decreases dissolution of the cyano-containing polymer in the electrolyte but also enables the cyano-containing polymer to well dissolve in an organic solvent such as N-methylpyrrolidone, making the cyano-containing polymer and the positive electrode active material mixed well so as to reduce side reactions between the positive electrode active material and the electrolyte, thereby improving the high-temperature performance of the electrochemical apparatus.

In one implementation of this application, the electrochemical apparatus further includes an electrolyte, where the electrolyte includes a nitrile additive and based on a total mass of the positive electrode material layer, a percentage sum of the cyano-containing polymer and the nitrile additive is more than 0 wt % and less than or equal to 5 wt %.

In this application, based on the total mass of the positive electrode material layer, a mass percentage of the cyano-containing polymer is x (wt %), and a mass percentage of mass of the nitrile additive in the electrolyte in the total mass of the positive electrode material layer is z (wt %), and therefore, based on the total mass of the positive electrode material layer, a percentage sum of the cyano-containing polymer and the nitrile additive is x+z (wt %). Regardless of any theory, based on the total mass of the positive electrode material layer, the percentage sum of the cyano-containing polymer and the nitrile additive being controlled so that 0 wt %<x+z≤5 wt % is favorable for improvement of the high-temperature performance of the electrochemical apparatus.

For example, x+z may be 1.5 wt %, 2.0 wt %, 2.5 wt %, 3.0 wt %, 3.5 wt %, 4.0 wt %, 4.5 wt %, or 5 wt % or in any range therebetween. When x+z is undesirably large, for example, being 6.0 wt %, a total amount of cyano functional groups in the electrochemical apparatus is undesirably high.

The inventor has found that due to the strong electronegativity of cyano functional groups, carbon linked to cyano functional groups typically carries active α-H, and when the total amount of cyano functional groups in the electrochemical apparatus is undesirably large, the amount of free active α-H in the electrolyte is undesirably large accordingly, accelerating consumption of the negative electrode additive. For example, the active α-H reacts with the negative electrode additive, fluorinated ethylene carbonate (FEC), to produce hydrogen fluoride. Moreover, the fast consumption of the negative electrode additive leads to inadequate protection of the negative electrode additive on the negative electrode material layer during cycling, accelerating degradation of cycling performance of the electrochemical apparatus. The impact on the cycling performance of the electrochemical apparatus is more obvious in a silicon negative electrode system. In addition, the inventor has also found that, when x+z is undesirably large, for example, being 6.0 wt %, so as to cause an undesirably large total amount of cyano functional groups in the electrochemical apparatus, undesirably large amounts of cyano functional groups and active α-H are present in the electrolyte, and possibly because of the strong ability of cyano functional groups to complex with Cu ions, it is much likely to occur that the negative electrode current collector copper foil dissolves in the electrolyte and then deposits on the negative electrode plate, meaning copper precipitation occurs on the negative electrode. The copper precipitation on the negative electrode in turn impacts storage performance of the electrochemical apparatus. For example, the copper precipitation on the negative electrode makes the electrochemical apparatus have an undesirably large voltage drop K value, which means voltage drop per unit storage time (in mV/h), causing the electrochemical apparatus to self discharge, thus impacting the storage performance of the electrochemical apparatus.

In one implementation of this application, the nitrile additive includes at least one of succinonitrile, adiponitrile, ethylene glycol bis(2-cyanoethyl) ether, or 1,2,3-tris(2-cyanoethoxy) propane. Regardless of any theory, selecting the above as the nitrile additive is favorable for improvement of the high-temperature performance of the electrochemical apparatus.

In one implementation of this application, based on the total mass of the positive electrode material layer, a percentage sum of the fluorine-containing polymer and the cyano-containing polymer is 2 wt % to 5 wt %.

In one implementation of this application, based on the total mass of the positive electrode material layer, a mass percentage of the cyano-containing polymer is x (wt %) and a mass percentage of the fluorine-containing polymer is y (wt %), and therefore based on the mass of the positive electrode material layer, a percentage sum of the cyano-containing polymer and the fluorine-containing polymer is x+y (wt %). Regardless of any theory, the percentage sum of the fluorine-containing polymer and the cyano-containing polymer being controlled so that 2 wt %≤x+y≤5 wt % is favorable for improvement of the high-temperature cycling performance of the electrochemical apparatus.

For example, x+y may be 2.5 wt %, 3 wt %, 3.5 wt %, 4 wt %, or 4.5 wt % or in any range therebetween. When x+y is undesirably small, for example, being 1 wt %, meaning an undesirably low percentage sum of the cyano-containing polymer and the fluorine-containing polymer, the bonding effect between particles in the positive electrode material layer is impacted, making it hard for the positive electrode material layer applied on the positive electrode plate to form a film that is attached onto the positive electrode plate. As a result, the positive electrode material layer is prone to depart from the positive electrode plate, putting the positive electrode plate at risk of film stripping. When x+y is undesirably large, for example, being 6 wt %, meaning an undesirably high percentage sum of the cyano-containing polymer and the fluorine-containing polymer, an undesirably small amount of positive electrode active material is present in the positive electrode material layer so that energy density of the electrochemical apparatus is lower. In addition, with the percentage sum of the cyano-containing polymer and the fluorine-containing polymer being undesirably high, after the positive electrode plate is cold pressed, the positive electrode material layer applied on the positive plate is prone to brittle fracture after cold pressing, which is called cold-press brittle fracture for brevity.

In one implementation of this application, the positive electrode material layer includes a positive electrode active material and the positive electrode active material includes at least one of lithium cobaltate, lithium manganate, lithium nickelate, lithium nickel manganate, lithium nickel cobalt oxide, lithium nickel cobalt manganate, lithium nickel cobalt aluminate, lithium iron phosphate, lithium iron manganese phosphate, or a lithium-rich material. Regardless of any theory, selecting the above positive electrode active material is favorable for improvement of the high-temperature performance of the electrochemical apparatus. For example, the lithium nickel cobalt manganate may include at least one of $LiNi_{1/3}Co_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short), or $LiNi_{0.8}Co_{0.1}Mn_{0.1}O_2$ (NCM811 for short).

In this application, the positive electrode material layer may further include a conductive agent. This application has no particular limitation on the conductive agent, provided that the objective of this application can be achieved. For example, the conductive agent may include but is not limited to at least one of conductive carbon black (Super P), carbon nanotube (CNTs), carbon fiber, flake graphite, Ketjen black, graphene, metal material, or conductive polymer. The carbon nanotube may include but is not limited to a single-walled carbon nanotube and/or a multi-walled carbon nanotube. The carbon fiber may include but is not limited to vapor-phase carbon fiber (VGCF) and/or carbon nanofiber. The metal material may include but is not limited to metal powder and/or metal fiber. Specifically, the metal may include but is not limited to at least one of copper, nickel, aluminum, or silver. The conductive polymer may include but is not limited to at least one of polyphenylene derivative, polyaniline, polythiophene, polyacetylene, or polypyrrole.

In this application, the positive electrode plate may further include a positive electrode current collector. This application has no particular limitation on the positive electrode current collector, provided that the objective of this application can be achieved. The positive electrode current collector may use a metal foil or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, a matrix of polypropylene (PP), polyethylene terephthalate (PET), polybutylene terephthalate (PBT), polystyrene (PS), or polyethylene (PE)).

Optionally, the positive electrode plate may further include a conductive layer and the conductive layer is located between the positive electrode current collector and the positive electrode material layer. This application has no particular limitation on the composition of the conductive layer, and the conductive layer may be a conductive layer commonly used in the field. The conductive layer may include but is not limited to the above conductive agent and the above binder.

In this application, the electrochemical apparatus further includes a negative electrode plate, where the negative electrode plate may further include a negative electrode material layer, the negative electrode material layer including a negative electrode active material.

In this application, the negative electrode active material is not particularly limited, provided that the objective of this application can be achieved. For example, the negative electrode active material may include but is not limited to artificial graphite, natural graphite, soft carbon, hard carbon, silicon-based material, tin-based material, lithium titanate, and the like. The silicon-based material may be selected from at least one of elemental silicon, silicon-oxygen compound, silicon-carbon composite, silicon-nitrogen composite, or silicon alloy. The tin-based material may be selected from at least one of elemental tin, tin-oxygen compound, or tin alloy.

In this application, the negative electrode material layer may further include a conductive agent. This application has no particular limitation on the conductive agent, provided that the objective of this application can be achieved. For example, the conductive agent may include but is not limited to at least one of conductive carbon black (Super P), carbon nanotube (CNTs), carbon fiber, flake graphite, Ketjen black, graphene, metal material, or conductive polymer. The carbon nanotube may include but is not limited to a single-walled carbon nanotube and/or a multi-walled carbon nanotube. The carbon fiber may include but is not limited to vapor-phase carbon fiber (VGCF) and/or carbon nanofiber. The metal material may include but is not limited to metal powder and/or metal fiber. Specifically, the metal may include but is not limited to at least one of copper, nickel, aluminum, or silver. The conductive polymer may include but is not limited to at least one of polyphenylene derivative, polyaniline, polythiophene, polyacetylene, or polypyrrole.

In this application, the negative electrode material layer may further include a binder. This application has no particular limitation on the binder, provided that the objective of this application can be achieved. For example, the binder may include but is not limited to at least one of polyacrylic acid, sodium polyacrylate, potassium polyacrylate, lithium polyacrylate, polyimide, polyvinyl alcohol, carboxymethyl cellulose, sodium carboxymethyl cellulose, polyimide, polyamideimide, styrene-butadiene rubber, or polyvinylidene fluoride.

In this application, the negative electrode plate may further include a negative electrode current collector. This application has no particular limitation on the negative electrode current collector, provided that the objective of this application can be achieved. For example, the negative electrode current collector may include but is not limited to copper foil, copper alloy foil, nickel foil, stainless steel foil, titanium foil, nickel foam, copper foam, a composite current collector, or the like. In this application, thickness of the negative electrode current collector is not particularly limited, provided that the objective of this application can be achieved. For example, the thickness of the negative electrode current collector is 4 μm to 12 μm.

Optionally, the negative electrode plate may further include a conductive layer and the conductive layer is located between the negative electrode current collector and the negative electrode material layer. This application has no particular limitation on the composition of the conductive layer, and the conductive layer may be a conductive layer commonly used in the field. The conductive layer may include but is not limited to the above conductive agent and the above binder.

In this application, the electrolyte may further include a lithium salt. This application has no particular limitation on the lithium salt, provided that the objective of this application can be achieved. For example, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. Preferably, the lithium salt includes $LiPF_6$.

In this application, the electrolyte may further include a non-aqueous solvent. This application has no particular limitation on the non-aqueous solvent, provided that the objective of this application can be achieved. For example, the non-aqueous solvent may include but is not limited to at least one of carboxylic ester compounds, ether compounds, or other organic solvents. The carboxylic ester compound may include but is not limited to at least one of methyl formate, ethyl formate, methyl propionate, ethyl propionate, propyl propionate, gamma-butyrolactone, decalactone, valerolactone, or caprolactone. The ether compound may include but is not limited to at least one of dibutyl ether, tetraglyme, diglyme, 1, 2-dimethoxyethane, 1, 2-diethoxyethane, 1-ethoxy-1-methoxyethane, 2-methyltetrahydrofuran, or tetrahydrofuran. The other organic solvents may include but is not limited to at least one of dimethyl sulfoxide, 1,2-dioxolane, methyl sulfolane, 1,3-dimethyl-2-imidazolidinone, N-methyl-2-pyrrolidone, dimethylformamide, trimethyl phosphate, triethyl phosphate, or trioctyl phosphate.

In this application, the electrochemical apparatus further includes a separator. In this application, the separator is not particularly limited, provided that the objective of this application can be achieved. For example, the separator may include but is not limited to at least one of a polyolefin (PO) type separator mainly consisting of polyethylene (PE), polypropylene (PP), and polytetrafluoroethylene, polyester film (for example, polyethylene terephthalate (PET) film), cellulose film, polyimide film (PI), polyamide film (PA), spandex or aramid film, woven film, non-woven film (non-woven fabrics), microporous film, composite film, separator paper, laminated film, spinning film, or the like.

The electrochemical apparatus in this application is not particularly limited, and may include any apparatus in which an electrochemical reaction occurs. In some implementations, the electrochemical apparatus may include but is not limited to a lithium metal secondary battery, a lithium-ion secondary battery (lithium-ion battery), a lithium polymer secondary battery, a lithium-ion polymer secondary battery, or the like.

The preparation process of electrochemical apparatuses is well known to those skilled in the art and is not particularly limited in this application. For example, the preparation process may include but is not limited to the following steps: stacking the positive electrode plate, separator, and negative electrode plate in sequence and winding or folding the stack as required to obtain an electrode assembly having a winding structure; putting the electrode assembly into a packaging bag, injecting electrolyte into the packaging bag, and sealing the packaging bag to obtain an electrochemical apparatus; or, stacking the positive electrode plate, separator, and negative electrode plate in sequence, then fixing four corners of the stack structure with tapes to obtain an electrode assembly having a stack structure, putting the electrode assembly into a packaging bag, injecting electrolyte into the packaging bag, and sealing the packaging bag to obtain an electrochemical apparatus. In addition, an overcurrent protection element, a guide plate, and the like may be placed in the packaging bag as required to prevent pressure rise and discharge of overcharge in the electrochemical apparatus.

In this application, a mass ratio of the electrolyte to the positive electrode material layer in the electrochemical apparatus is 0.2 to 0.4, preferably 0.25 to 0.35.

A second aspect of this application provides an electronic apparatus, including the electrochemical apparatus according to any one of the implementations in the first aspect of this application. The electronic apparatus has good high-temperature performance, such as high-temperature cycling performance and high-temperature storage performance.

The electronic apparatus in this application is not particularly limited, and may be any known electronic apparatus in the prior art. In some embodiments, the electronic apparatus may include but is not limited to a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notepad, a calculator, a memory card, a portable recorder, a radio, a standby power source, a motor, an automobile, a motorcycle, a power-assisted bicycle, a bicycle, a lighting appliance, a toy, a game console, a clock, an electric tool, a flash lamp, a camera, a large household battery, a lithium-ion capacitor, and the like.

EXAMPLES

The following describes the embodiments of this application more specifically through examples and comparative examples. Various tests and evaluations were performed in the following methods.

Test Method and Equipment

High-temperature storage performance test:

An initial thickness do of the lithium-ion battery was tested. The lithium-ion battery was charged to a rated voltage at a constant current of a rate of 0.2 (C), then charged to a current of 0.05 C at the constant voltage (rated voltage), and finally discharged to 3.0 V at the constant current of 0.2 C. This was one pre-cycle. Two pre-cycles were performed on the newly-assembled lithium-ion battery, and then the lithium-ion battery was charged to 4.48 V at the constant current of 0.2 C. Subsequently, the lithium-ion battery was left in a 60° C. thermostat for storage. Thickness $d_1$ of the lithium-ion battery after storage for 0 days was measured at a constant temperature of 60° C. Afterwards, for every 7 days of storage, thickness $d_{n+1}$ of the lithium-ion battery after storage for n days was measured at the constant temperature of 60° C.

Thickness change rate after 0 days of storage=$(d_1-d_0)/d_0$

Thickness change rate after $n$ days of storage=$(d_{n+1}-d_0)/d_0$

Thickness change rates of the lithium-ion battery after different days of storage were measured through three parallel experiments, and an average of the rates recorded for the three parallel experiments under a given number of storage days was used as the final thickness change rate of the lithium-ion battery under that number of storage days.

High-Temperature Cycling Performance Test

The lithium-ion battery was placed in a 45° C. thermostat and left there for 30 minutes so that the lithium-ion battery reached a constant temperature. The lithium-ion battery reaching the constant temperature was charged to an upper limit voltage with a constant current at a rate of 1 C (C) under a temperature of 45° C., then charged to 0.05 C with a constant voltage (rated voltage). At that point, the lithium-ion battery was in a fully-charged state, as briefly described. Then, the lithium-ion battery was left standing for 5 minutes, and then discharged to 3.0 V with a constant current of 0.7 C. This was one charge-discharge cycle. The lithium-ion battery was so charged and discharged and the capacity retention rate of the lithium-ion battery after N cycles (N being a positive integer) was calculated. In this test, after every 50 cycles, the lithium-ion battery was subjected to one additional low-rate charge-discharge cycle. For the low-rate charge-discharge cycle, parameters were the same as the parameters in the above charge-discharge cycles except that the constant current discharge was conducted at 0.2 C.

The after-cycling capacity retention rate of the lithium-ion battery was calculated by the following equation:

Capacity retention rate=(discharge capacity of the $N$-th cycle/discharge capacity of the 1st cycle)× 100%

Capacity retention rates of the lithium-ion battery at different cycle numbers were measured through three parallel experiments, and an average of the rates recorded for the three parallel experiments under a given cycle number was used as the final capacity retention rate of the lithium-ion battery under that cycle number.

Extraction method of cyano-containing polymer:

The lithium-ion battery was disassembled so as to obtain a positive electrode plate. The positive electrode plate was washed three times with dimethyl carbonate (DMC) to remove free lithium salt on the surface and soluble components in the solid electrolyte interphase (SEI) film. The positive electrode plate was placed in N-methyl pyrrolidone, followed by stirring for 5 h. The product was filtered and a supernatant was obtained. The supernatant was separated via chromatography to obtain a dilute solution of pure-phase cyano-containing polymer.

Detection method of weight average molecular weight Mw of the cyano-containing polymer:

A laser optical scatterometer was used to measure scattered light intensities of dilute solutions of pure-phase cyano-containing polymer having different concentrations with incident light being in a small angle (2° C. to 7° C.). An absolute value of the weight average molecular weight Mw of the cyano-containing polymer in the dilute solutions was calculated based on the relationship between concentration and incident light angle. A dynamic light scattering method was used to collect light scattering caused by interaction between light and cyano-containing polymer molecules. These scattered light signals were related to the molecular size of the cyano-containing polymer and thus were able to be received and converted into electrical signals by a photoelectric detector. The electrical signals were processed by a computer so as to obtain information on the molecular size of the cyano-containing polymer, thereby obtaining a distribution curve of molecular sizes of the cyano-containing polymer.

Detection method of the molar ratio m of carbon (C) to nitrogen (N) in the cyano-containing polymer:

The dilute solution of pure-phase cyano-containing polymer was dried to obtain the cyano-containing polymer. Then a typical combustion elemental analysis method was used. The cyano-containing polymer was burned and $CO_2$ and $H_2O$ contents in the gas produced were analyzed, so as to obtain the molar ratio m of carbon (C) to nitrogen (N) in the cyano-containing polymer.

Example 1

<Preparation of Positive Electrode Plate>

A positive electrode active material lithium cobalt oxide ($LiCoO_2$), a conductive agent (Super P), polyacrylonitrile, and polyvinylidene fluoride (PVDF) were mixed at a mass ratio of 95:2:0.43:2.57, followed by adding N-methylpyrrolidone (NMP) and stirring by a vacuum mixer to obtain a uniform positive electrode slurry. A solid content of the positive electrode slurry was 70 wt %. The positive electrode slurry obtained was evenly applied on one surface of a positive electrode current collector aluminum foil having a thickness of 12 μm at a coating weight of 97.38 g/m$^2$, and then the aluminum foil was dried at 120° C. for an hour. Observation was made to see whether there was any coating departing from the positive electrode plate, or briefly whether there was any film stripping. If no film stripping was found, a positive electrode plate coated with a positive electrode material layer on one surface was obtained with a coating thickness of 110 μm. Then, these steps were repeated on the other surface of the aluminum foil to obtain a positive electrode plate coated with a positive electrode material layer on both surfaces. Then, cold pressing was performed, followed by observing whether the positive electrode material layers on the positive electrode plate had brittle fracture after the cold pressing, or briefly cold-press brittle fracture. If no cold-press brittle fracture was found, cutting and tab welding were performed to obtain a positive electrode plate having a size of 74 mm×867 mm.

<Preparation of Negative Electrode Plate>

A negative active material artificial graphite, a conductive agent (Super-P), a binder polyacrylic acid, and a thickener sodium carboxymethyl cellulose were mixed at a mass ratio of 83.5:10:5:1.5, and deionized water was added. The mixture was stirred by a vacuum mixer to obtain a uniform negative electrode slurry. A solid content of the negative electrode slurry was 75 wt %.

Polypropylene and the conductive agent (Super-P) were mixed at a mass ratio of 50:50, and deionized water was added. The mixture was stirred by a vacuum mixer to obtain a uniform base coat slurry. A solid content of the primer layer slurry was 75 wt %.

The base coat slurry was applied on one surface of a negative electrode current collector copper foil having a thickness of 12 μm, and the copper foil was dried at 120° C. to obtain a negative electrode plate coated on one surface with the base coat with a coating thickness of 30 μm. Then, these steps were repeated on the other surface of the copper foil to obtain a negative electrode plate coated with a base coat layer on both surfaces. Then the negative electrode slurry was applied on one surface of the copper foil coated with the base coat layer, and the copper foil was dried at 120° C. to obtain a negative electrode plate coated on one surface with a negative electrode material layer with a coating thickness of 130 μm. These steps were repeated on the other surface of the negative electrode current collector copper foil to obtain a negative electrode plate coated with a negative electrode material layer on both surfaces. Then cold pressing, cutting, and tab welding were performed so as to obtain a negative electrode plate having a size of 76 mm×874 mm.

<Preparation of Electrolyte>

In a dry argon environment, ethylene carbonate (EC), propylene carbonate (PC), and diethyl carbonate (DEC) were mixed at a mass ratio of 1:1:1 to obtain a base organic solvent, then lithium hexafluorophosphate ($LiPF_6$) was added into the base organic solvent and a uniform mixture was obtained. Then, an additive butanedinitrile was added so as to obtain an electrolyte, where a concentration of lithium hexafluorophosphate was 12.5 wt %, a mass percentage of butanedinitrile was 12 wt %, and the rest was the base organic solvent.

<Preparation of Separator>

A polyethylene (PE) membrane with a thickness of 12 μm was used.

<Preparation of Lithium-Ion Battery>

The positive electrode plate, the separator, and the negative electrode plate that were prepared above were stacked in sequence, so that the separator was sandwiched between the positive electrode plate and the negative electrode plate for separation, and the stack was wound to obtain an electrode assembly. The electrode assembly was placed in an aluminum-plastic packaging bag, followed by drying and electrode injection, where a mass ratio of the electrolyte to the positive electrode material layer was 0.3. Then processes including vacuum packaging, standing, formation, degassing, and trimming were performed to obtain a lithium-ion battery. The formation condition was charging to 3.3 V at a constant current of 0.02 C and then charging to 4.3 V at a constant current of 0.1 C.

Example 2 to Example 4

These examples were the same as Example 1 except that the parameters of preparation and performance were as given in Table 1.

Example 5 to Example 10

These examples were the same as Example 2 except that the parameters of preparation and performance were as given in Table 2.

Example 11 to Example 17

These examples were the same as Example 3 except that the parameters of preparation and performance were as given in Table 3.

Example 18 to Example 21

These examples were the same as Example 2 except that the parameters of preparation and performance were as given in Table 4.

Example 22 to Example 24

These examples were the same as Example 2 except that the parameters of preparation and performance were as given in Table 5.

Comparative Example 1 to Comparative Example 5

These comparative examples were the same as Example 1 except that the parameters of preparation and performance were as given in Table 1.

Comparative Example 6

This comparative example was the same as Example 2 except that the parameters of preparation and performance were as given in Table 4.

FIG. 1 shows thickness change rate curves of Example 1 and Comparative Example 1 under storage at 60° C.

As can be seen from the figure, under the same high-temperature storage conditions, the thickness change rate of Example 1 is always less than the thickness change rate of Comparative Example 1. In addition, when the storage time is prolonged from 7 days to 28 days, the thickness change rates of Example 1 and Comparative Example 1 increase constantly, but the increase rate of the thickness change rate of Example 1 is apparently less than the increase rate of the thickness change rate of Comparative Example 1. This shows that the positive electrode material layer including an appropriate amount of cyano-containing polymer improves the high-temperature storage performance of the lithium-ion battery.

Figure 2:
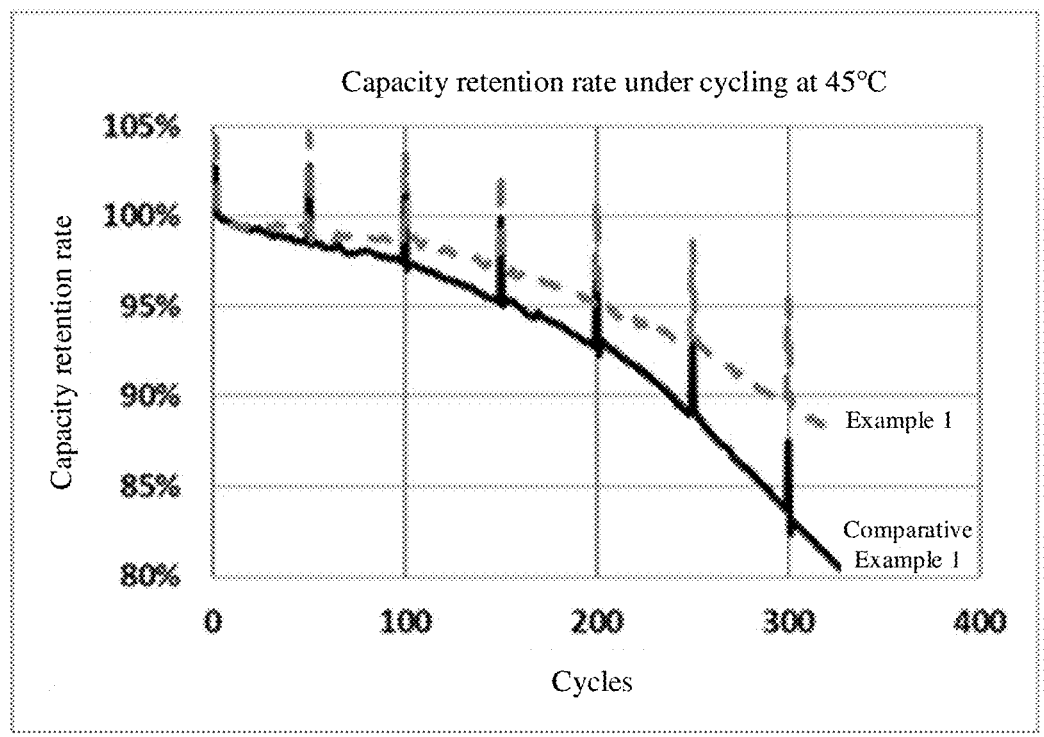
FIG. 2 shows capacity retention rate change curves of Example 1 and Comparative Example 1 under cycling at 45° C.

FIG. 2 shows capacity retention rate change curves of Example 1 and Comparative Example 1 under cycling at 45° C.

As can be seen from the figure, under the same high-temperature cycling conditions, the capacity retention rate of Example 1 is always higher than the capacity retention rate of Comparative Example 1. In addition, when the cycle number increases from 0 to 330 cycles, the capacity retention rates of Example 1 and Comparative Example 1 decrease constantly but the decrease rate of the capacity retention rate of Example 1 is apparently less than the decrease rate of the capacity retention rate of Comparative Example 1. This shows that the positive electrode material layer including an appropriate amount of cyano-containing polymer increases the high-temperature cycling capacity retention rate of the lithium-ion battery, thus improving the high-temperature cycling performance of the lithium-ion battery.

Figure 3:
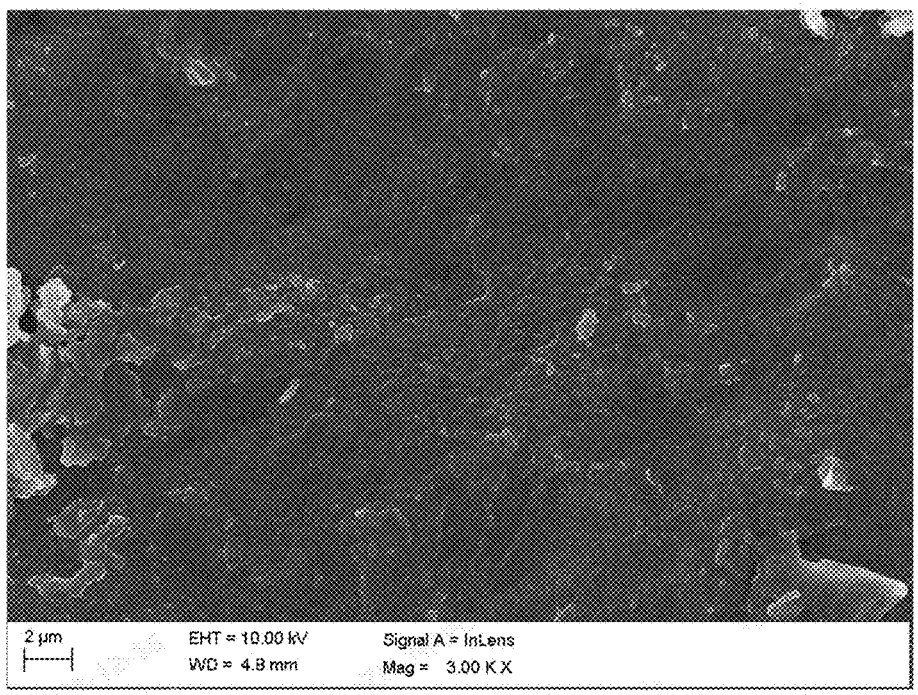
FIG. 3 is a scanning electron microscope photograph of a negative electrode plate in Example 20.
Figure 4:
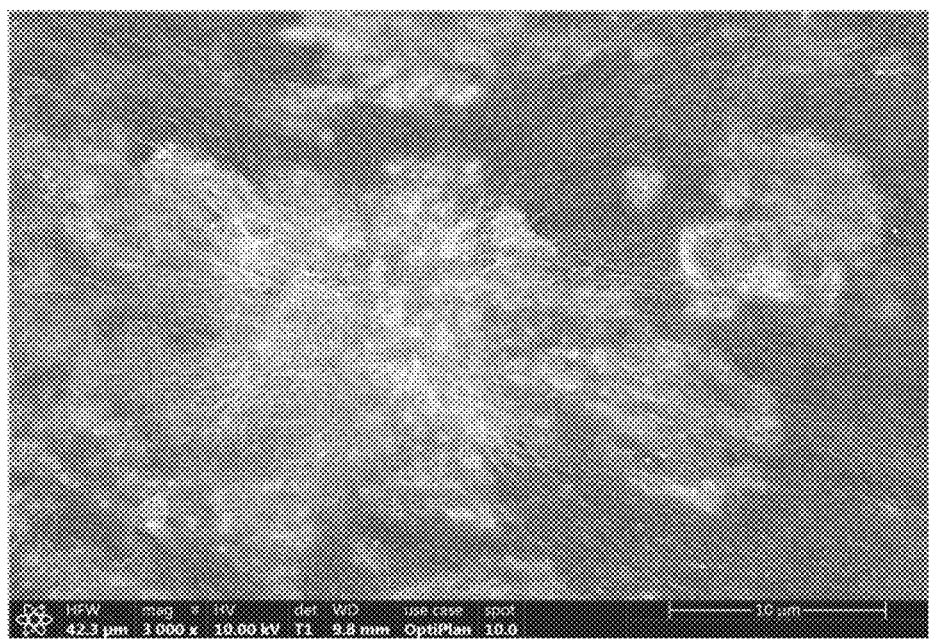
FIG. 4 is a scanning electron microscope photograph of a negative electrode plate in Comparative Example 6.

FIG. 3 and FIG. 4 respectively show scanning electron microscope (SEM) photographs of the negative electrode plates in Example 20 and Comparative Example 6.

As can be seen from the figures, when the percentage sum x+z of the cyano-containing polymer and the nitrile additive is 6.0 wt %, a white region apparently appears in the SEM photograph of the negative electrode plate in Comparative Example 6, and this region is a copper precipitation region. This shows that an undesirably high percentage sum of the cyano-containing polymer and the nitrile additive makes the negative electrode apt to have copper precipitation. By contrast, when the percentage sum x+z of the cyano-containing polymer and the nitrile additive is 3.0 wt %, no white region appears in the SEM photograph of the negative electrode plate in Comparative Example 20, meaning no apparent copper precipitation occurs on the negative electrode. This shows that based on the total mass of the positive electrode material layer, controlling the percentage sum of the cyano-containing polymer and the nitrile additive so that 0 wt %<x+z≤5 wt % can avoid copper precipitation on the negative electrode.

The parameters of preparation and performance of Examples and Comparative Examples are given in Table 1 to Table 5. The percentages of substances in Table 1 to Table 5 are all based on the mass of the positive electrode material layer.

TABLE 1

| Example | Cyano-containing polymer Type | Percentage x (wt %) | Fluorine-containing polymer Type | Percentage y (wt %) | Nitrile additive z (wt %) | b/a | x + y (wt %) | x + z (wt %) | m | $M_w$ | Capacity retention rate (300 cycles) |
|---|---|---|---|---|---|---|---|---|---|---|---|
| Example 1 | Polyacrylonitrile | 0.43 | Polyvinylidene fluoride | 2.57 | 3.57 | 0.10 | 3.0 | 4.0 | 3 | 500 | 89% |
| Example 2 | Polyacrylonitrile | 0.50 | Polyvinylidene fluoride | 2.50 | 3.50 | 0.12 | 3.0 | 4.0 | 3 | 500 | 90% |
| Example 3 | Polyacrylonitrile | 1.10 | Polyvinylidene fluoride | 1.90 | 2.90 | 0.35 | 3.0 | 4.0 | 3 | 500 | 91% |
| Example 4 | Polyacrylonitrile | 1.36 | Polyvinylidene fluoride | 1.64 | 2.64 | 0.50 | 3.0 | 4.0 | 3 | 500 | 92% |
| Comparative Example 1 | Polyacrylonitrile | — | Polyvinylidene fluoride | 3.00 | 4.00 | 0 | 3.0 | 4.0 | 3 | 500 | 83% |
| Comparative Example 2 | Polyacrylonitrile | 0.10 | Polyvinylidene fluoride | 2.90 | 3.90 | 0.02 | 3.0 | 4.0 | 3 | 500 | 83% |
| Comparative Example 3 | Polyacrylonitrile | 1.50 | Polyvinylidene fluoride | 1.50 | 2.50 | 0.60 | 3.0 | 4.0 | 3 | 500 | Electrode plate having film stripped |
| Comparative Example 4 | Polyacrylonitrile | 3.00 | Polyvinylidene fluoride | 3.00 | 1.00 | 0.60 | 6.0 | 4.0 | 3 | 500 | Cold-press brittle fracture |
| Comparative Example 5 | Polyacrylonitrile | 2.00 | Polyvinylidene fluoride | 2.00 | — | — | 2.0 | 4.0 | 3 | 500 | Electrode plate having film stripped |

Note:
The "—" in Table 1 indicates absence of any applicable parameter or substance.

TABLE 2

| Example | Cyano-containing polymer Type | Percentage x (wt %) | Fluorine-containing polymer Type | Percentage y (wt %) | Nitrile additive z (wt %) | b/a | x + y (wt %) | x + z (wt %) | m | $M_w$ | Capacity retention rate (300 cycles) |
|---|---|---|---|---|---|---|---|---|---|---|---|
| Example 5 | Poly(2-chloroacrylonitrile) | 0.82 | Polyvinylidene fluoride | 2.50 | 3.18 | 0.12 | 3.32 | 4.0 | 3 | 500 | 93% |
| Example 6 | Poly(2-butylene nitrile) | 0.63 | Polyvinylidene fluoride | 2.50 | 3.40 | 0.12 | 3.13 | 4.0 | 4 | 500 | 90% |
| Example 7 | Poly(3-butylene nitrile) | 0.63 | Polyvinylidene fluoride | 2.50 | 3.40 | 0.12 | 3.13 | 4.0 | 4 | 500 | 92% |
| Example 8 | Poly(3-pentenrile) | 0.75 | Polyvinylidene fluoride | 2.50 | 3.30 | 0.12 | 3.25 | 4.0 | 5 | 500 | 94% |
| Example 9 | Poly(2-ethyl-2-butenenitrile) | 0.89 | Polyvinylidene fluoride | 2.50 | 3.10 | 0.12 | 3.39 | 4.0 | 6 | 500 | 92% |
| Example 10 | Poly(2-isopropyl-2-butenenitrile) | 1.01 | Polyvinylidene fluoride | 2.50 | 3.00 | 0.12 | 3.51 | 4.0 | 7 | 500 | 87% |

TABLE 3

| Example | Cyano-containing polymer Type | Percentage x (wt %) | Fluorine-containing polymer Type | Percentage y (wt %) | Nitrile additive z (wt %) | b/a | x + y (wt %) | x + z (wt %) | m | $M_w$ | Capacity retention rate (300 cycles) |
|---|---|---|---|---|---|---|---|---|---|---|---|
| Example 11 | Polyacrylonitrile | 0.50 | Polyvinylidene fluoride | 2.50 | 3.50 | 0.12 | 3.0 | 4.0 | 3 | 250 | 92% |

TABLE 3-continued

| Example | Cyano-containing polymer Type | Percentage x (wt %) | Fluorine-containing polymer Type | Percentage y (wt %) | Nitrile additive z (wt %) | b/a | x + y (wt %) | x + z (wt %) | m | $M_w$ | Capacity retention rate (300 cycles) |
|---|---|---|---|---|---|---|---|---|---|---|---|
| Example 12 | Polyacrylonitrile | 0.50 | Polyvinylidene fluoride | 2.50 | 3.50 | 0.12 | 3.0 | 4.0 | 3 | 300 | 93% |
| Example 13 | Polyacrylonitrile | 0.50 | Polyvinylidene fluoride | 2.50 | 3.50 | 0.12 | 3.0 | 4.0 | 3 | 1000 | 92% |
| Example 14 | Polyacrylonitrile | 0.50 | Polyvinylidene fluoride | 2.50 | 3.50 | 0.12 | 3.0 | 4.0 | 3 | 2000 | 92% |
| Example 15 | Polyacrylonitrile | 0.50 | Polyvinylidene fluoride | 2.50 | 3.50 | 0.12 | 3.0 | 4.0 | 3 | 5000 | 90% |
| Example 16 | Polyacrylonitrile | 0.50 | Polyvinylidene fluoride | 2.50 | 3.50 | 0.12 | 3.0 | 4.0 | 3 | 6000 | 89% |
| Example 17 | Polyacrylonitrile | 0.50 | Polyvinylidene fluoride | 2.50 | 3.50 | 0.12 | 3.0 | 4.0 | 3 | 8000 | 83% |

TABLE 4

| Example | Cyano-containing polymer Type | Percentage x (wt %) | Fluorine-containing polymer Type | Percentage y (wt %) | Nitrile additive z (wt %) | b/a | x + y (wt %) | x + z (wt %) | m | $M_w$ | Capacity retention rate (300 cycles) | Negative electrode has copper precipitation? |
|---|---|---|---|---|---|---|---|---|---|---|---|---|
| Example 18 | Polyacrylonitrile | 0.50 | Polyvinylidene fluoride | 2.50 | 0 | 0.12 | 3.0 | 0.5 | 3 | 300 | 88% | No |
| Example 19 | Polyacrylonitrile | 0.50 | Polyvinylidene fluoride | 2.50 | 1.50 | 0.12 | 3.0 | 2.0 | 3 | 500 | 90% | No |
| Example 20 | Polyacrylonitrile | 0.50 | Polyvinylidene fluoride | 2.50 | 2.50 | 0.12 | 3.0 | 3.0 | 3 | 500 | 92% | No |
| Example 21 | Polyacrylonitrile | 0.50 | Polyvinylidene fluoride | 2.50 | 4.50 | 0.12 | 3.0 | 5.0 | 3 | 500 | 91% | No |
| Comparative Example 6 | Polyacrylonitrile | 0.50 | Polyvinylidene fluoride | 2.50 | 5.50 | 0.12 | 3.0 | 6.0 | 3 | 500 | 83% | Copper is precipitated |

TABLE 5

| Example | Cyano-containing polymer Type | Percentage x (wt %) | Fluorine-containing polymer Type | Percentage y (wt %) | Nitrile additive z (wt %) | b/a | x + y (wt %) | x + z (wt %) | m | $M_w$ | Capacity retention rate (300 cycles) |
|---|---|---|---|---|---|---|---|---|---|---|---|
| Example 22 | Polyacrylonitrile | 0.33 | Polyvinylidene fluoride | 1.67 | 3.50 | 0.12 | 2.0 | 4.0 | 3 | 500 | 88% |
| Example 23 | Polyacrylonitrile | 0.67 | Polyvinylidene fluoride | 3.33 | 3.50 | 0.12 | 4.0 | 4.0 | 3 | 500 | 93% |
| Example 24 | Polyacrylonitrile | 0.83 | Polyvinylidene fluoride | 4.17 | 3.50 | 0.12 | 5.0 | 4.0 | 3 | 500 | 89% |

As can be seen from Examples 1 to 4 and Comparative Examples 1 to 5, adding the cyano-containing polymer and the fluorine-containing polymer into the positive electrode material layer and controlling the ratio b/a of the mole number b of nitrogen to the mole number a of fluorine so that 0.1≤b/a≤0.5 enable a good bonding effect between particles in the positive electrode material layer, so that the positive electrode plate is free of film stripping and cold-press brittle fracture while the lithium-ion battery has a higher capacity retention rate.

As can be seen from Examples 5 to 10 and Example 2, on the basis of adding the cyano-containing polymer and the fluorine-containing polymer into the positive material layer and controlling the ratio b/a of the mole number b of nitrogen to the mole number a of fluorine so that 0.1≤b/a≤0.5, controlling the molar ratio m of carbon (C) to nitrogen (N) in the cyano-containing polymer in the positive electrode active material layer so that $2<m\leq6$ makes the lithium-ion battery have a higher capacity retention rate.

As can be seen from Examples 11 to 17 and Example 2, on the basis of adding the cyano-containing polymer and the fluorine-containing polymer into the positive material layer and controlling the ratio b/a of the mole number b of nitrogen to the mole number a of fluorine so that $0.1\leq b/a\leq0.5$, controlling the weight average molecular weight Mw of the cyano-containing polymer so that Mw is 250 to 8000 makes the lithium-ion battery have a higher capacity retention rate. When Mw is more than 8000, for example, being 10000, it is hard for the cyano-containing polymer to dissolve in N-methylpyrrolidone, and the electrode plate additive is not uniformly dispersed in the cathode electrode plate, so that improvement of the high-temperature performance is not obvious.

As can be seen from Examples 18 to 21, Example 2, and Comparative Example 6, on the basis of adding the cyano-containing polymer and the fluorine-containing polymer into the positive electrode material layer and controlling the ratio b/a of the mole number b of nitrogen to the mole number a of fluorine so that $0.1\leq b/a\leq0.5$, $0$ wt $\%<x+z>5$ wt % is satisfied, where no copper precipitation occurs on the negative electrode plate, and the lithium-ion battery has a higher capacity retention rate. This shows that on the basis that the ratio b/a of the mole number b of nitrogen to the mole number a of fluorine in the positive electrode material layer satisfies $0.1\leq b/a\leq0.5$, based on the total mass of the positive electrode material layer, controlling the percentage sum of cyano-containing polymer and the nitrile additive so that $0$ wt $\%<x+z\leq5$ wt % can avoid copper precipitation on the negative electrode plate of the lithium-ion battery and make the lithium-ion battery have a higher capacity retention rate.

As can be seen from Examples 22 to 24 and Example 2, on the basis of adding the cyano-containing polymer and the fluorine-containing polymer into the positive material layer and controlling the ratio b/a of the mole number b of nitrogen to the mole number a of fluorine so that $0.1\leq b/a\leq0.5$, x+y being in the range of 2 wt % to 5 wt % makes the lithium-ion battery have a higher capacity retention rate. This shows that on the basis that the ratio b/a of the mole number b of nitrogen to the mole number a of fluorine in the positive electrode material layer satisfies $0.1\leq b/a\leq0.5$, based on the total mass of the positive electrode material layer, controlling the percentage sum x+y of cyano-containing polymer and the fluorine-containing polymer so that $2$ wt $\%\leq x+y\leq5$ wt % can make the lithium-ion battery have a higher capacity retention rate.

The foregoing descriptions are merely preferable embodiments of this application which are not intended to limit the protection scope of this application. Any modifications, equivalent replacements, and improvements made without departing from the spirit and principle of this application fall within the protection scope of this application.

What is claimed is:

1. An electrochemical apparatus, comprising: a positive electrode plate, wherein the positive electrode plate comprises a positive electrode material layer, and the positive electrode material layer comprises a fluorine-containing polymer and a cyano-containing polymer, wherein a ratio b/a of a mole number b of nitrogen to a mole number a of fluorine in the positive electrode material layer satisfies $0.1\leq b/a\leq0.5$;
wherein a weight average molecular weight of the cyano-containing polymer is 250 to 8000.

2. The electrochemical apparatus according to claim 1, wherein $0.3\leq gb/a\leq0.5$.

3. The electrochemical apparatus according to claim 1, wherein the fluorine-containing polymer comprises at least one of polyvinylidene fluoride, polytetrafluoroethylene, polyhexafluoropropylene, vinylidene fluoride-tetrafluoroethylene copolymer, vinylidene fluoride-hexafluoropropylene copolymer, tetrafluoroethylene-hexafluoropropylene copolymer, or vinylidene fluoride-tetrafluoroethylene-hexafluoropropylene terpolymer.

4. The electrochemical apparatus according to claim 1, wherein the cyano-containing polymer comprises at least one of polyacrylonitrile, poly(2-butenenitrile), poly(3-butenenitrile), acrylonitrile-(2-butenenitrile) copolymer, acrylonitrile-(3-butenenitrile) copolymer, (2-butenenitrile)-(3-butenenitrile) copolymer, acrylonitrile-(2-butenenitrile)-(3-butenenitrile) terpolymer, or melamine.

5. The electrochemical apparatus according to claim 1, wherein a molar ratio of carbon (C) to nitrogen (N) in the cyano-containing polymer is m, and $2<m\leq6$.

6. The electrochemical apparatus according to claim 1, further comprising an electrolyte, wherein the electrolyte comprising a nitrile additive, and based on a total mass of the positive electrode material layer, a percentage sum of the cyano-containing polymer and the nitrile additive is more than 0 wt % and less than or equal to 5 wt %.

7. The electrochemical apparatus according to claim 6, wherein the nitrile additive comprises at least one of succinonitrile, adiponitrile, ethylene glycol bis(2-cyanoethyl) ether, or 1,2,3-tris(2-cyanoethoxy) propane.

8. The electrochemical apparatus according to claim 1, wherein based on a total mass of the positive electrode material layer, a percentage sum of the cyano-containing polymer and the fluorine-containing polymer is 2 wt % to 5 wt %.

9. The electrochemical apparatus according to claim 1, wherein the positive electrode material layer comprises a positive electrode active material, and the positive electrode active material comprises at least one of lithium cobaltate, lithium manganate, lithium nickelate, lithium nickel manganate, lithium nickel cobalt oxide, lithium nickel cobalt manganate, lithium nickel cobalt aluminate, lithium iron phosphate, lithium iron manganese phosphate, or a lithium-rich material.

10. An electronic apparatus comprises an electrochemical apparatus, the electrochemical apparatus comprises a positive electrode plate, wherein the positive electrode plate comprises a positive electrode material layer, and the positive electrode material layer comprises a fluorine-containing polymer and a cyano-containing polymer, wherein a ratio b/a of a mole number b of nitrogen to a mole number a of fluorine in the positive electrode material layer satisfies $0.1\leq b/a\leq0.5$;
wherein a weight average molecular weight of the cyano-containing polymer is 250 to 8000.

11. The electronic apparatus according to claim 10, wherein $0.3$ $gb/a\leq0.5$.

12. The electronic apparatus according to claim 10, wherein the fluorine-containing polymer comprises at least one of polyvinylidene fluoride, polytetrafluoroethylene, polyhexafluoropropylene, vinylidene fluoride-tetrafluoroethylene copolymer, vinylidene fluoride-hexafluoropropylene copolymer, tetrafluoroethylene-hexafluoropropylene copolymer, or vinylidene fluoride-tetrafluoroethylene-hexafluoropropylene terpolymer.

13. The electronic apparatus according to claim 10, wherein the cyano-containing polymer comprises at least one of polyacrylonitrile, poly(2-butenenitrile), poly(3-butenenitrile), acrylonitrile-(2-butenenitrile) copolymer, acrylonitrile-(3-butenenitrile) copolymer, (2-butenenitrile)-(3-butenenitrile) copolymer, acrylonitrile-(2-butenenitrile)-(3-butenenitrile) terpolymer, or melamine.

14. The electronic apparatus according to claim 10, wherein a molar ratio of carbon (C) to nitrogen (N) in the cyano-containing polymer is m, and $2<m\leq6$.

15. The electronic apparatus according to claim 10, further comprising an electrolyte, wherein the electrolyte comprising a nitrile additive, and based on a total mass of the positive electrode material layer, a percentage sum of the cyano-containing polymer and the nitrile additive is more than 0 wt % and less than or equal to 5 wt %.

16. The electronic apparatus according to claim 15, wherein the nitrile additive comprises at least one of succinonitrile, adiponitrile, ethylene glycol bis(2-cyanoethyl) ether, or 1,2,3-tris(2-cyanoethoxy) propane.

17. The electronic apparatus according to claim 10, wherein based on a total mass of the positive electrode material layer, a percentage sum of the cyano-containing polymer and the fluorine-containing polymer is 2 wt % to 5 wt %.

18. The electronic apparatus according to claim 10, wherein the positive electrode material layer comprises a positive electrode active material, and the positive electrode active material comprises at least one of lithium cobaltate, lithium manganate, lithium nickelate, lithium nickel manganate, lithium nickel cobalt oxide, lithium nickel cobalt manganate, lithium nickel cobalt aluminate, lithium iron phosphate, lithium iron manganese phosphate, or a lithium-rich material.

* * * * *